(12) United States Patent
Hofmann et al.

(10) Patent No.: US 12,416,333 B2
(45) Date of Patent: Sep. 16, 2025

(54) BEARING ASSEMBLY

(71) Applicant: AKTIEBOLAGET SKF, Gothenburg (SE)

(72) Inventors: Gregory Hofmann, Telford, PA (US); Hans Wallin, Cape Coral, FL (US); Benkui Xia, Nanjing (CN); Jingwen Zhang, Shanghai (CN)

(73) Assignee: AKTIEBOLAGET SKF, Gothenburg (SE)

(*) Notice: Subject to any disclaimer, the term of this patent is extended or adjusted under 35 U.S.C. 154(b) by 205 days.

(21) Appl. No.: 18/317,322

(22) Filed: May 15, 2023

(65) Prior Publication Data

US 2024/0384753 A1    Nov. 21, 2024

(51) Int. Cl.
*F16C 35/06* (2006.01)
*F04D 29/056* (2006.01)
*F16C 19/54* (2006.01)
*F16C 35/067* (2006.01)

(52) U.S. Cl.
CPC .......... *F16C 35/067* (2013.01); *F04D 29/056* (2013.01); *F16C 19/543* (2013.01); *F16C 19/548* (2013.01)

(58) Field of Classification Search
CPC ...... F16C 19/54; F16C 19/541; F16C 19/542; F16C 19/543; F16C 19/546; F16C 19/547; F16C 19/548; F16C 35/06; F16C 35/061; F16C 35/063; F16C 35/067; F04D 29/056
See application file for complete search history.

(56) References Cited

U.S. PATENT DOCUMENTS

| | | | | |
|---|---|---|---|---|
| 5,409,359 A | * | 4/1995 | Takano | ................... F16C 19/56 384/615 |
| 2016/0160857 A1 | * | 6/2016 | Wallin | ................... F04D 29/063 184/6.16 |

FOREIGN PATENT DOCUMENTS

| | | | | |
|---|---|---|---|---|
| JP | 58160621 A | * | 9/1983 | |
| JP | 2015151998 A | * | 8/2015 | ........... F04D 29/056 |

OTHER PUBLICATIONS

Machine Translation of JP-58160621-A (Year: 1983).*
Machine Translation of JP-2015151998-A (Year: 2015).*

* cited by examiner

*Primary Examiner* — Alan B Waits
(74) *Attorney, Agent, or Firm* — J-TEK LAW PLLC; Scott T. Wakeman; Mark A. Ussai

(57) ABSTRACT

A bearing assembly is for supporting a shaft in a housing, preferably a rotor shaft of a centrifugal compressor. The bearing assembly includes at least a first bearing pair including a first rolling bearing and a second rolling bearing arranged back to back, each one of the first and second rolling bearings including an inner ring attached to the shaft, an outer ring and a plurality of rolling elements disposed between the inner ring and the outer ring. A radial gap is provided between the outer ring of the first rolling bearing and the housing and the outer ring of the second rolling bearing is in contact with the housing. Preferably, a fixing element restricts axial movement of the outer ring of the first rolling bearing with respect to the housing.

11 Claims, 5 Drawing Sheets

BEARING ASSEMBLY

BACKGROUND OF THE INVENTION

The present invention relates to a bearing assembly, in particular a bearing assembly for supporting a shaft such as a rotor shaft of a centrifugal compressor or a centrifugal pump.

Different technical systems, for example compressors such as centrifugal compressors or centrifugal pumps, but also many other technical systems, may comprise a shaft, for example a rotor shaft, supported by bearings. In such systems, the shaft may be subjected to an axial load, wherein the axial load is predominantly in one axial direction, but at certain operating conditions, the axial load can reverse and be in the opposite direction. In the case of centrifugal compressors, the axial load is produced by gear forces, in case of gear drive, and gas forces acting on the impeller(s). There are also radial loads primarily produced by the weight of components.

A conventional bearing arrangement may for example comprise angular contact ball bearings or tapered roller bearings which are typically arranged in pairs to control bearing clearance, bi-directional loads and shaft displacement. It is also possible to have only one single bearing, however, when there is a constant single load direction and the speed is low.

In a bearing pair, which operates with combined axial and radial loads, one bearing acts as a thrust bearing, taking the axial load and most of the radial loading. The other bearing is a backup bearing, taking radial load only and controlling the clearance between the two bearings. The pair of the bearings can be arranged either face-to-face or back-to-back. The most common is back-to-back because this arrangement has the advantage that, by only clamping the inner rings, the clearance is controlled as the forces acting on the bearing during usage cause the bearings, i.e., the outer rings, to move toward each other. In contrast, with face-to-face arrangements, the bearings tend to drift in opposite directions and thus, both the outer and the inner rings must be clamped to control clearance.

In particular with rotors, such as electric motor rotors and centrifugal compressor rotors, a common bearing arrangement may use angular contact ball bearings in pairs on both sides of the rotor with the pairs in back-to-back arrangement to avoid the necessity of clamping the outer rings, as described above. Typically, one pair is fixed, taking the axial load and positioning the rotor, while the other pair supports radial loads only.

However, angular contact ball bearings or tapered roller bearings arranged in pairs, both in back-to-back and face-to-face arrangements, in particular with back-to-back arrangements are sensitive to misalignment. This is the case as the bearings oppose misalignment of the shaft by inducing additional radial forces to counteract the misalignment.

SUMMARY OF THE INVENTION

It is therefore object of the present invention to provide an improved bearing arrangement with reduced misalignment sensitivity.

This object is achieved by a bearing assembly for supporting a shaft in a housing, the bearing assembly comprising at least a first bearing pair including a first rolling bearing and a second rolling bearing arranged back to back, each one of the first and second rolling bearings including an inner ring attached to the shaft, an outer ring and rolling elements interposed between the inner ring and the outer ring. A radial gap is provided between the outer ring of the first rolling bearing and the housing and the outer ring of the second rolling bearing is in contact with the housing.

The bearing assembly is usable for supporting a shaft in a housing, in particular a rotor shaft within a centrifugal compressor. The housing may be the housing of the compressor. The bearing assembly comprises at least a first bearing pair including a first and a second rolling bearing arranged back to back, wherein each rolling bearing comprises an inner ring, an outer ring and rolling elements, in particular at least one row of rolling elements, being interposed between the inner ring and the outer ring. As described above, for pairs of bearings in back-to-back arrangement, it may be sufficient to clamp the inner rings which are attached to the shaft.

The rolling bearings may be for example angular contact ball bearings or tapered roller bearings. Such bearings may provide the advantage that they may withstand combined loads, that is, radial and axial loads acting simultaneously. Angular contact ball bearings may particularly be used for high speed and high precision applications like centrifugal compressors or centrifugal pumps.

During operation, an axial load may act on the shaft in a first axial direction or a second axial direction, wherein the second axial direction is opposite to the first axial direction. This axial load leads to an axial load and a radial load acting on the bearing pairs. The axial load acting on the shaft may arise, for example, from gears or gas forces acting on the impeller(s).

As described above, misalignment of the shaft may induce additional radial loads to the bearings. In order to be insensitive to such a misalignment, a radial gap is provided between the outer ring of the first rolling bearing and the housing while the outer ring of the second rolling bearing is in contact with the housing.

The radial gap provides a clearance between the outer ring of the first rolling bearing and the housing so that the first rolling bearing cannot transmit a radial load to the housing. Instead, the outer ring of the first rolling bearing can slightly move radially due to the radial gap and thus, a radial load, which would be produced otherwise in case of a misalignment of the shaft, will not be generated and cannot be absorbed via the radial gap.

Therefore, by providing a simple radial gap between one outer ring of the bearing pair and the housing, the bearing pair provides a reduced sensitivity to misalignment of shaft.

In an embodiment, between the outer rings of the first bearing pair, at least one distance element may be arranged for restricting an axial movement of the outer ring of the first rolling bearing with respect to the outer ring of the second rolling bearing. The distance element, for example a spacer ring, may include passages for supplying lubricant to the bearings.

The first rolling bearing, which is provided with the radial gap between the outer ring and the housing, may be the thrust bearing. The second rolling bearing, which may be a backup bearing, then takes all radial load and the thrust bearing takes axial load only. No additional radial load is induced by misalignment because the thrust bearing is radially free.

In angular contact ball bearings as well as in tapered roller bearings, under rotation, there is an axial bearing load induced by centrifugal forces on the balls or rollers. The induced force increases with contact angle and speed and adds to the axial load of the load carrying bearing.

Further, the axial load carrying capacity of angular contact ball bearings or tapered roller bearings increases with increasing contact angle while the radial load capacity decreases with increasing contact angle. The contact angle is a known bearing design feature and is defined as the angle between the line connecting the point of contact of the ball/roller and the raceway in the radial plane angle.

Thus, in the arrangement where the first rolling bearing is the thrust bearing, it may be advantageous to have a thrust bearing with a larger contact angle than the backup bearing, i.e., the first rolling bearing may have a contact angle with a value greater than the value of the contact angle of the second rolling bearing. These different contact angles may be advantageous, particularly if the direction of axial load does not reverse or is significantly reduced.

Alternatively, the first rolling bearing, which is provided with the radial gap between the outer ring and the housing, may be the backup bearing. The second rolling bearing, which may be a thrust bearing, then takes all radial and axial load. No additional radial load is induced by misalignment because the backup bearing is radially free. In this case, the function of the backup bearing is only control of clearance. The backup bearing may have a smaller contact angle than the thrust bearing, wherein the smaller contact angle induces less axial load from centrifugal loads from the rolling elements. These different contact angles may be advantageous, if the direction of axial load does not reverse or is significantly reduced.

If the direction of axial load reverses, the function of the first and the second rolling bearing, i.e., the backup and the thrust bearing, is reversed so the bearing with a gap in the housing takes axial load only and the other bearing takes radial load. This may be valid for both configurations, i.e., the first rolling bearing being the backup or the thrust bearing.

For example, the difference between the contact angles may be 10 to 15 degrees. For example, the higher contact angle may be 25 degrees and the lower contact angle may be 15 degrees or the higher contact angle may be 40 degrees and the lower contact angle may be 25 degrees.

In the above-described examples, wherein the first rolling bearing is either the backup or the thrust bearing, it may be advantageous to have different contact angles as described above; that is, the first rolling bearing has a contact angle with a value and the second rolling bearing has a contact angle with a value different than the value of the first rolling bearing contact angle. However, this only applies for applications in which the axial load is primarily in one direction. In contrast to that, in applications where the axial load is in both directions, it may be advantageous that the first and the second rolling bearings, i.e., the backup and the thrust bearing, have the same contact angles (the value of the contact angles are equal).

According to a further embodiment, the bearing assembly further comprises at least one fixing element for restricting the axial movement of the outer ring of the first rolling bearing with respect to the housing.

In addition to restricting the axial movement of the outer ring of the first rolling bearing with respect to the outer bearing of the second rolling bearing using the distance element, the movement of the outer ring of the first rolling bearing, i.e., of the outer ring having the radial gap with respect to the housing, is restricted in both axial directions. This provides the advantage that the bearing pair does not act as fixed/free bearing arrangement but provides a fixed bearing arrangement.

According to a further embodiment, the bearing assembly comprises at least a second bearing pair spaced from the first bearing pair and including a first and a second rolling bearing arranged back to back, wherein each rolling bearing comprises an inner ring, an outer ring and rolling elements, in particular at least one row of rolling elements, interposed between the inner ring and the outer ring, wherein the inner rings are attached to the shaft, a radial gap is provided between the outer ring of the first rolling bearing and the housing, the second bearing pair comprises at least one fixing element for restricting an axial movement of the outer ring of the first rolling bearing, and the outer ring of the second rolling bearing is in contact with the housing. Between the first and the second bearing pair, the motor rotor of a centrifugal compressor may be arranged.

The rolling bearings of the second bearing pair may also be angular contact ball bearings or tapered roller bearings. Such an arrangement comprising two bearing pairs, each being arranged back-to-back, may be advantageous when used in centrifugal compressors or the like which typically comprise two pairs of angular contact ball bearings.

According to a further embodiment, the first rolling bearing of the first bearing pair and the first rolling bearing of the second bearing pair are facing each other. This means that the inner rolling bearings of the arrangement of the two bearings pairs have a radial gap with respect to the housing. Alternatively, the second rolling bearing of the first bearing pair and the second rolling bearing of the second bearing pair may face each other. In this case, the outer rolling bearings of the arrangement of the two bearings pairs have a radial gap with respect to the housing.

It may be slightly better to have the radial gap such the one bearing takes only radial load and the other only axial load, because this may maximize the system life of the arrangement. Alternatively, one bearing takes both axial and radial load and the function of the other is only to control (axial) clearance.

The first and the second bearing pair may be used in a fixed/floating bearing arrangement so that the first bearing pair is axially fixed and that the second bearing pair is axially floating. In this embodiment, the movement of the outer rings of the first and the second rolling bearing of the first bearing pair may be restricted in both axial directions. In contrast to that, the movement of the outer rings of the first and the second rolling bearing of the second bearing pair is free in both axial directions.

According to a further embodiment, it is also possible to arrange the pairs in cross location. This means that the function of the bearing pairs shifts, i.e., one pair taking radial loads only to taking combined loads, when the axial load direction changes.

For achieving such an arrangement, the first or the second rolling bearing of the first bearing pair may be configured to abut against a first axial abutment arranged at an axial outer end of the bearing assembly, wherein a clearance is provided between the first or the second rolling bearing of the first bearing pair and the first axial abutment. Further, the first or the second rolling bearing of the second bearing pair is configured to abut against a second axial abutment arranged at an axial outer end of the bearing assembly, wherein a clearance is provided between the first or the second rolling bearing of the second bearing pair and the second axial abutment. The rolling bearings having the radial gap with respect to the housing may either be the inner rolling bearings or the outer roller bearings, as described above.

By having the above-described arrangement including the abutment elements, the first bearing pair may be configured to support an axial load and a radial load, and the second bearing pair may be configured to support a radial load when the axial load acts in the first axial direction. Conversely, when the axial load acts in the second axial direction, e.g., when the axial load reverses as it may happen at certain operating conditions, the first bearing pair may be configured to support a radial load, and the second bearing pair may be configured to support an axial load and a radial load. This cross location arrangement and cross distribution have the advantage that both bearing pairs have the ability to support radial as well as axial loads, in contrast to other bearing assemblies where one bearing pair could support only radial loads as described above. This arrangement allows a uniform distribution of the load.

This arrangement is especially advantageous when the loads are about equal in both directions. Each pair is then used in the most advantageous arrangement with the thrust bearing having a larger contact angle than the backup bearing and the backup bearing being radially free, with a gap in the housing to minimize sensitivity to misalignment.

As described above, the axially outer bearings of the two bearing pairs may have a different contact angle than the axially inner bearings of the two bearing pairs. The rolling bearings having the higher contact angles may particularly be adapted for axial loads and the bearings having the smaller contact angles may particularly be adapted for radial loads. This provides an increase in the axial load capacity due to the optimization of the bearings with respect to axial and radial loads.

This means that to optimize the axial load capacity for each bearing pair, according to this embodiment, the load carrying bearing, i.e., the thrust bearing, has a large contact angle while the backup bearing has a small contact angle to minimize the induced axial load. This arrangement provides increased axial load capacity for the pair compared to a pair with equal contact angles and provides the advantage of different contact angles for loads in both directions. This is possible by having identical bearing pairs with different contact angles with the pairs arranged in cross location. When the load is in one direction that bearing pair carries the axial load and the opposite pair takes radial load only. When the load reverses, the pair on the reverse side carries the axial load and the opposite pair takes radial loading only.

The axial abutments may be configured to prevent a displacement of the respective bearing pairs in one direction. The first and/or the second axial abutment may be for example be a respective shoulder formed on the housing of the compressor.

The clearance or gap provided between the first rolling bearing of the first bearing pair and the first axial abutment and/or between the first rolling bearing of the second bearing pair and the second axial abutment may have the effect that the first rolling bearing of the first bearing pair and/or the first rolling bearing of the second bearing pair are not preloaded against the opposite pair. Due to the clearance, the first rolling bearing of the first bearing pair and/or the first rolling bearing of the second bearing pair may move slightly towards the respective abutment and may also move slightly away from the respective abutment.

As described above, the second rolling bearing of the first bearing pair may be the axially inner bearing and may be configured to be a thrust bearing. Further, the second rolling bearing of the second bearing pair may be the axially inner bearing and may be configured to be a thrust bearing. In contrast to that, the respective outer bearings are configured to be backup bearings. This provides an improved cross arrangement of backup bearings and thrust bearings in combination with the axial clearance, preferably together with a cross arrangement with respect to the contact angles as described above. Such a cross arrangement provides an improved distribution of axial and radial loads compared to previous bearing assemblies without such a cross arrangement.

Further, the direction of the axial load applied to the shaft may change without any negative impact to the bearing pairs as each bearing pair may support axial as well as radial loads by having one bearing specialized for axial loads and radial loads and one bearing specialized for radial loads.

Further advantages and advantageous embodiments are specified in the description, the drawings, and the claims. Here in particular the combinations of features specified in the description and in the drawings are purely exemplary, so that the features may also be present individually or combined in other ways.

BRIEF DESCRIPTION OF THE SEVERAL VIEWS OF THE DRAWINGS

In the following, the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION OF THE INVENTION

Figure 1:
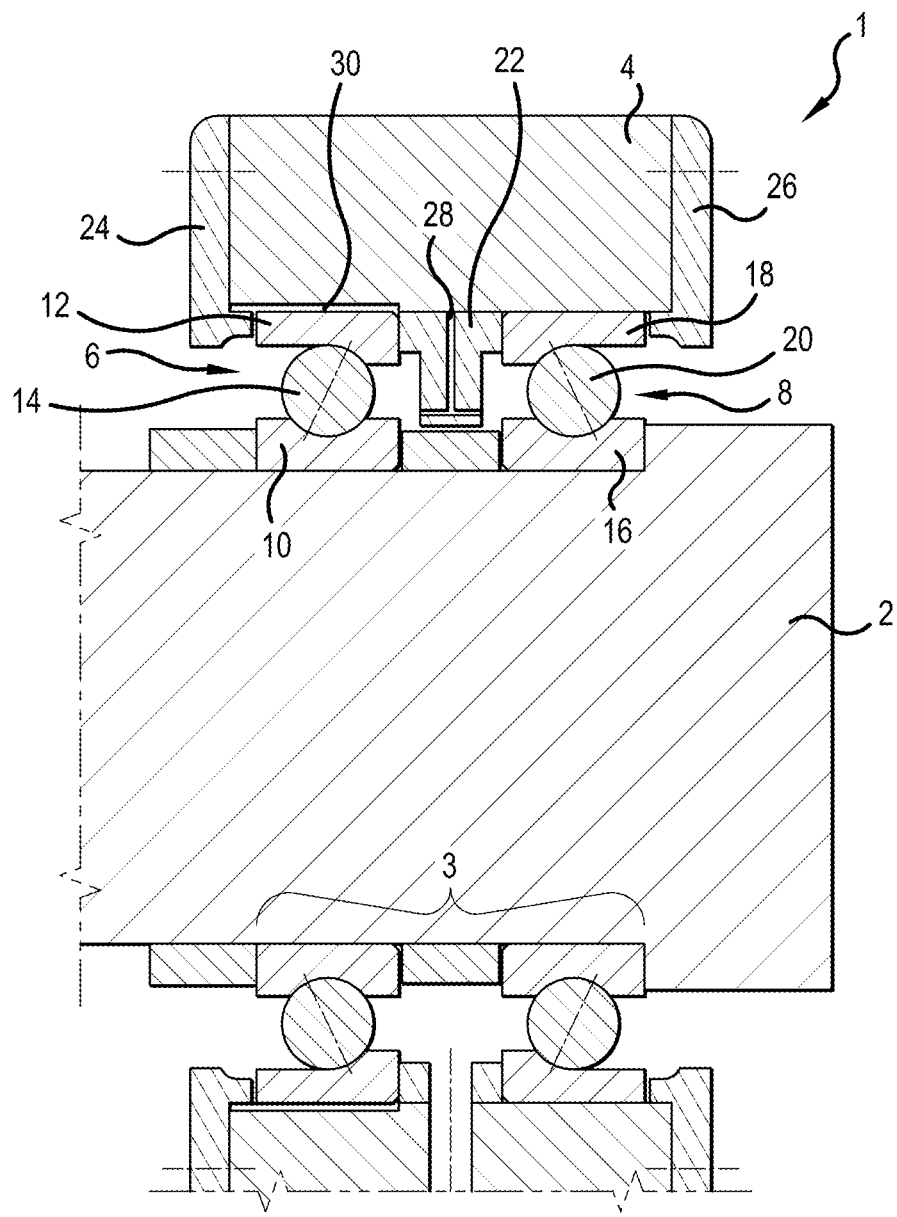
FIG. 1 shows a sectional view of a bearing assembly including a first bearing pair.

FIG. 1 shows a bearing assembly 1 which may be used for supporting a shaft 2 within a housing 4, in particular a rotor shaft within a centrifugal compressor. The bearing assembly 1 may also be used for a centrifugal pump.

In the example shown in FIG. 1, the bearing assembly 1 comprises a first bearing pair 3 which includes a first rolling bearing 6 and a second rolling bearing 8. The first and the second rolling bearings 6, 8 are depicted as angular contact ball bearings. However, the first and the second rolling bearings 6, 8 could also be tapered roller bearings. The first and the second rolling bearings 6, 8 are preferably arranged "back to back".

Each rolling bearing 6, 8 comprises an inner ring 10, 16, respectively, an outer ring 12, 18, respectively, and a plurality of rolling elements 14, 20, respectively, interposed or disposed between the inner ring 10, 16 and the outer ring 12, 18. The inner rings 10, 16 are arranged on the shaft 2 and may be clamped together. The outer ring 18 of the second rolling bearing 8 is attached to the housing 4. Between the first rolling bearing 6 and the second rolling bearing 8, an optional distance element 22, for example a spacer ring, may be arranged. The distance element 22 may include passages 28 for supplying lubricant to the bearings 6, 8. The distance element 22 may be configured to restrict the axial movement of the outer ring 12 of the first rolling bearing 6 with respect to the second rolling bearing 8.

In the embodiment shown in FIG. 1, the bearing assembly 1 is a fixed bearing assembly. This means that restricting elements 24, 26 are arranged at both axial ends of the outer rings 12, 18 for restricting the axial movements of both outer rings 12, 18 and for clamping the outer rings 12, 18 together. The restricting elements 24, 26 may be an integral part of the housing 4 or may be attached, for example screwed, to the housing 4.

During operation, an axial load may act on the shaft 2 in a first axial direction or a second axial direction, wherein the second axial direction is opposite to the first axial direction. This axial load leads to both an axial load and a radial load acting on the bearing pair 3. The axial load acting on the shaft 2 may arise, for example, from gas forces acting on the impeller(s).

As a misalignment of the shaft 2 may induce additional radial loads to the bearings 6, 8, the bearing assembly 1 should be insensitive to such a misalignment. Therefore, a radial 30 gap is provided between the outer ring 12 of the first rolling bearing 6 and the housing 4. In contrast to that, the outer ring 18 of the second rolling bearing 8 is in contact with the housing 4.

The radial gap 30 provides a clearance between the outer ring 12 of the first rolling bearing 6 and the housing 4. Therefore, the outer ring 12 can move in the radial direction with respect to the housing 4 and will not induce any radial load on the housing 4. As no radial load will be induced, the whole bearing assembly 1 is insensitive to misalignment of the shaft 2.

Figure 2:
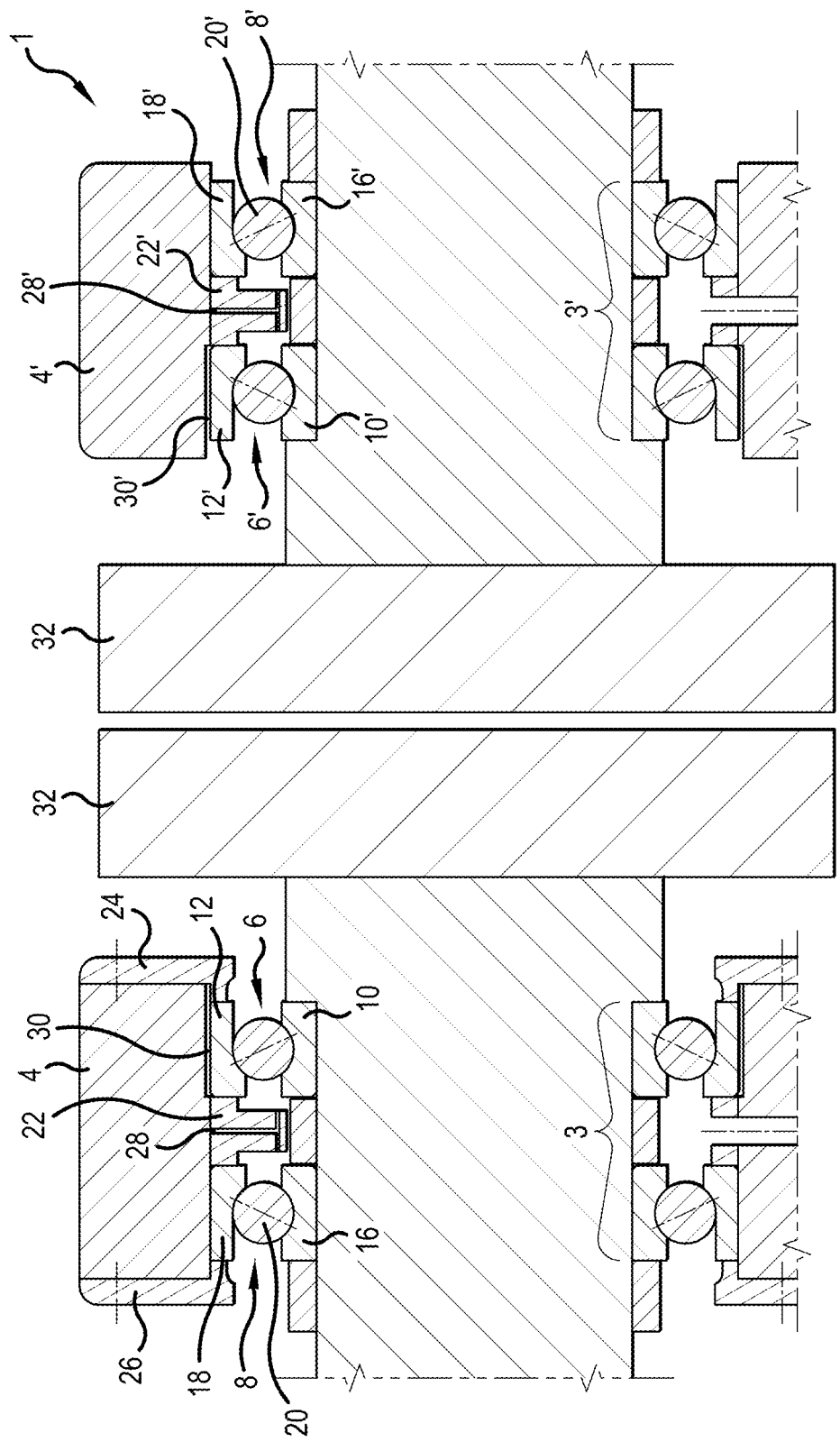
FIG. 2 shows a section view of a bearing assembly including a first and a second bearing pair in a first configuration.

In a further embodiment as illustrated in FIG. 2, the bearing assembly 1 may comprise the first bearing pair 3 and an additional second bearing pair 3'. Between the first and the second bearing pairs 3, 3', the motor rotor 32 of a centrifugal compressor may be arranged.

It should be noted that the elements of the second bearing pair 3' are referenced by the same reference elements as the elements of the first bearing pair 3, wherein the elements of the second bearing pair 3' have an additional apostrophe for indicating that the elements belong to the second bearing pair 3'.

The second bearing pair 3' is spaced from the first bearing pair 3 and includes a first rolling bearing 6' and a second rolling bearing 8' arranged back to back. As with the rolling bearings 6, 8 of the first bearing pair 3, the rolling bearings 6', 8' comprises an inner ring 10', 16', respectively, an outer ring 12', 18', respectively, and a plurality of rolling elements 14', 20', respectively, interposed/disposed between the inner ring 10', 16' and the outer ring 12', 18'. The inner rings 10', 16' are arranged on the shaft 2 and may be clamped together. The outer ring 18' of the second rolling bearing 8' is attached to the housing 4'. It should be noted that, although the housing 4, 4' is shown as separate elements, the housing 4, 4' may also be the same element and may be for example the housing of the compressor.

Between the first and the second rolling bearing 6', 8', a distance element 22' is arranged which may include passages 28' for supplying lubricant to the bearings 6', 8'. The distance element 22' may restrict the axial movement of the outer ring 12' with respect to the second rolling bearing 8'.

In the embodiment shown in FIG. 2, the bearing assembly 1 is a fixed/floating bearing assembly 1. This means that the axial movement of the bearing pair 3 is restricted by the restricting elements 24, 26, which are arranged at both axial ends of the outer rings 12, 18. In contrast to that, the bearing pair 3' is free in its axial movement, i.e., is floating and does not comprise any restricting elements.

In the embodiment of FIG. 2, the first rolling bearings 6, 6' are the inner rolling bearings. Thus, the bearings 6, 6' having a radial gap 30, 30' between the outer ring 12, 12' and the housing 4, 4' are the inner bearings.

Figure 3:
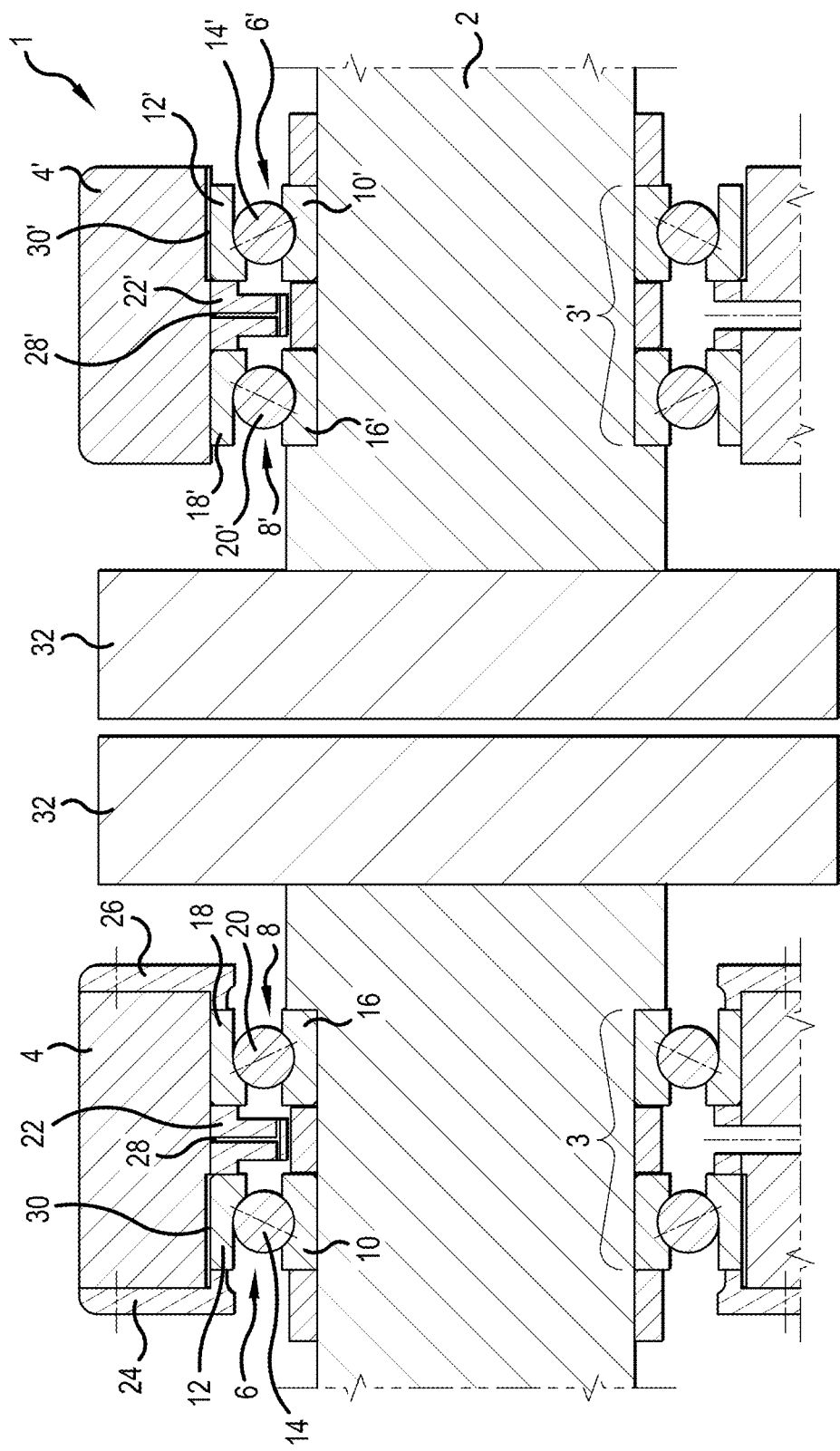
FIG. 3 shows a section view of a bearing assembly including a first and a second bearing pair in a second configuration.

In an alternative embodiment as shown in FIG. 3, the first rolling bearings 6, 6' are the outer rolling bearings. Thus, the bearings 6, 6' having a radial gap 30, 30' between the outer ring 12, 12' and the housing 4, 4' are the outer bearings.

Figure 4:
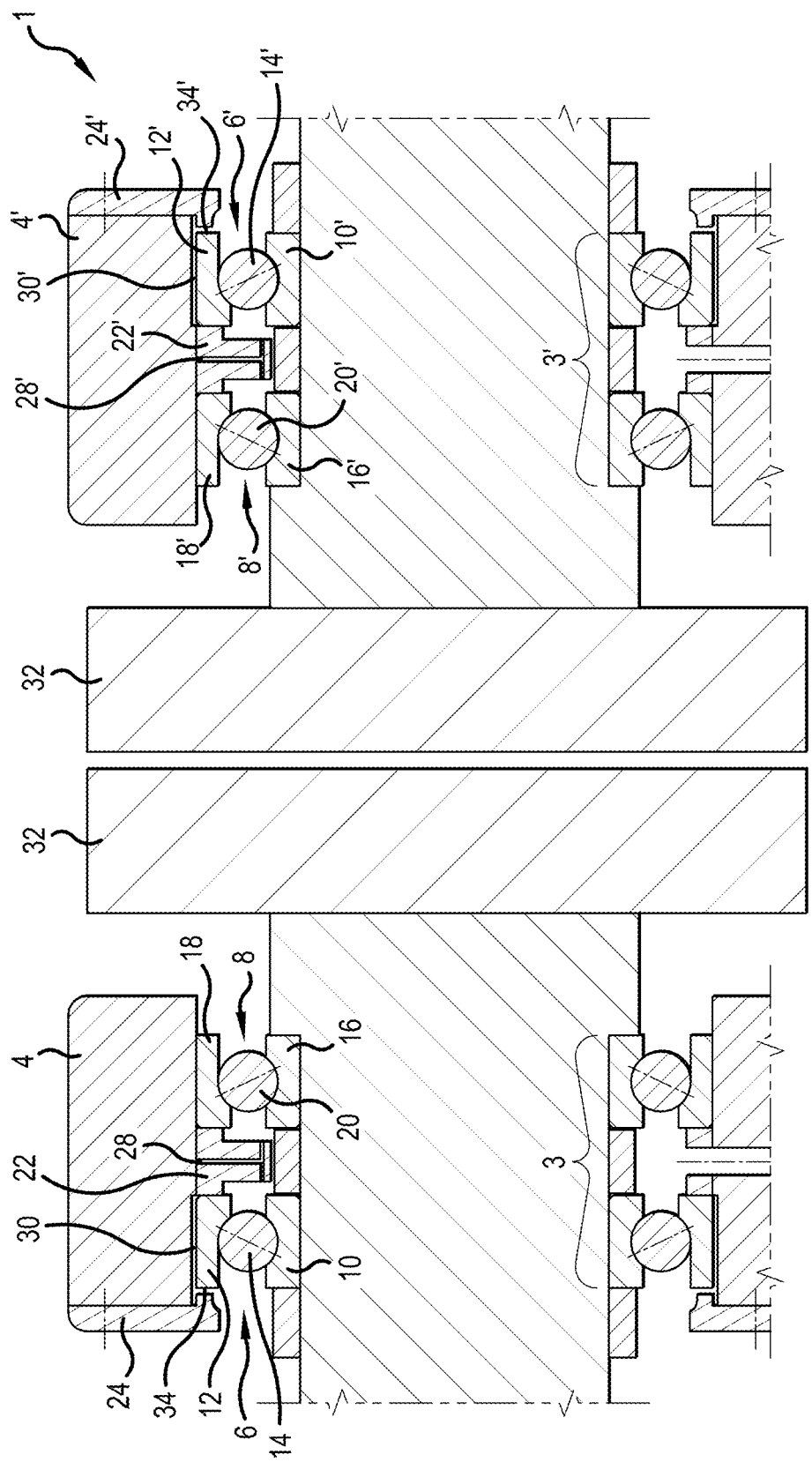
FIG. 4 shows a section view of a bearing assembly including a first and a second bearing pair in a third configuration.

In a further embodiment as shown in FIG. 4, in addition to having the radial gap 30, 30', the bearing pairs 3, 3' may be arranged in cross location. Thus, the bearings 6, 8 and 6', 8' are arranged in a cross arrangement so that both bearing pairs 3, 3' have the ability to support radial loads as well as axial loads, as will be described in the following.

The axial load acting on the shaft 2 leads to an axial load and a radial load acting on the bearing pairs 3, 3'. In order to allow a uniform distribution of the load as well as the support of the axial load also when the axial load direction reverses, the first bearing pair 3 is configured to support both an axial load and a radial load and the second bearing pair 3' is configured to support a radial load when the axial load acts in a first axial direction. Conversely, when the axial load acts in the opposite, second axial direction, the first bearing pair 3 is configured to support a radial load and the second bearing pair 3' is configured to support both an axial load and a radial load.

For this purpose, the first rolling bearing 6 of the first bearing pair 3 being the axially outer bearing is configured as a backup bearing and abuts against an axial abutment 24 which may be the restricting element as described above. Similarly, the first rolling bearing 6' of the second bearing pair 3' being the axially outer bearing is configured as a backup bearing and abuts against an axial abutment 24' which may also be the restricting element as described above. In addition, the first rolling bearings 6, 6' each have the radial gap 30, 30', respectively, with respect to the housing 4, 4', whereas the second rolling bearings 8, 8' contact the housing 4, 4'.

The abutments 24, 24' may be, for example, a respective shoulder formed on the housing 4, 4'. The abutments 24, 24' may prevent a displacement of the bearing pairs 3, 3' in one axial direction. A clearance 34, 34' is provided between the first rolling bearing 6 of the first bearing pair 3 and the axial abutment 24 and between the first rolling bearing 6' of the second bearing pair 3' and the axial abutment 24'. Such a clearance or gap 34, 34' allows that the first bearing pair 3 and the second bearing pair 3' can slightly move in the axial direction with respect to the axial abutment 24, 24'. The clearance or gap 34, 34' may have the effect, or minimize the risk, that the pairs are not preloaded against each other. Due to the clearance 34, 34', the first rolling bearing 6 of the first bearing pair 3 and the first rolling bearing 6' of the second bearing pair 3' may move slightly towards the respective abutment 24, 24' and may also move slightly away from the respective abutment 24, 24'.

When an axial load is applied in the first axial direction, the first rolling bearing 6 of the first bearing pair 3 serves as backup bearing and supports radial load, whereas the second rolling bearing 8 of the first bearing pair 3 serves as thrust bearing and supports axial as well as radial load. Conversely, when an axial load is applied in the opposite axial direction, the first rolling bearing 6' of the second bearing pair 3' serves as backup bearing and supports radial load, whereas the second rolling bearing 8' of the second bearing pair 3' serves as thrust bearing and supports axial as well as radial load.

Due to this cross arrangement of thrust and backup bearings, the direction of the axial load applied to the shaft 2 may change without any negative impact to the bearing pairs 3, 3' as each bearing pair 3, 3' may support axial as well as radial loads by having one bearing 6, 6' specialized for supporting both axial loads and radial loads and one bearing 8, 8' specialized for supporting radial loads only.

In the arrangements described with a radial gap 30, 30' at one bearing location, depending on the axial load direction, either the loads are separated such that one bearing takes axial load only and the other radial load only, or one bearing takes both axial and radial load and the other only controls clearance. This may seem disadvantageous compared to an arrangement without radial gaps, where both bearing share axial and radial load, which is the case, but only if there is no misalignment. With misalignment and increasing misalignment, the induced radial load caused by misalignment quickly shortens the life of the bearings in the arrangement without radial gaps while the bearings in the arrangements with radial gaps 30, 30' are relatively insensitive with only slight reduction in life. This can be seen in FIG. 5, which illustrates the bearing assembly life ratio on the y-axis vs. the bearing ring misalignment on the x-axis. The line with square points illustrates the bearing assembly life ratio having bearings without radial gap. In contrast to that, the line with circular points illustrates the bearing assembly life ratio of a bearing assembly having a thrust bearing with a radial gap 30, 30' and the line with triangular points illustrates the bearing assembly life ratio of a bearing assembly having a backup bearing with a radial gap 30, 30'. As can be seen, both arrangements show a better bearing assembly life ratio when misalignment occurs than the bearing assembly without any radial gap.

Figure 5:
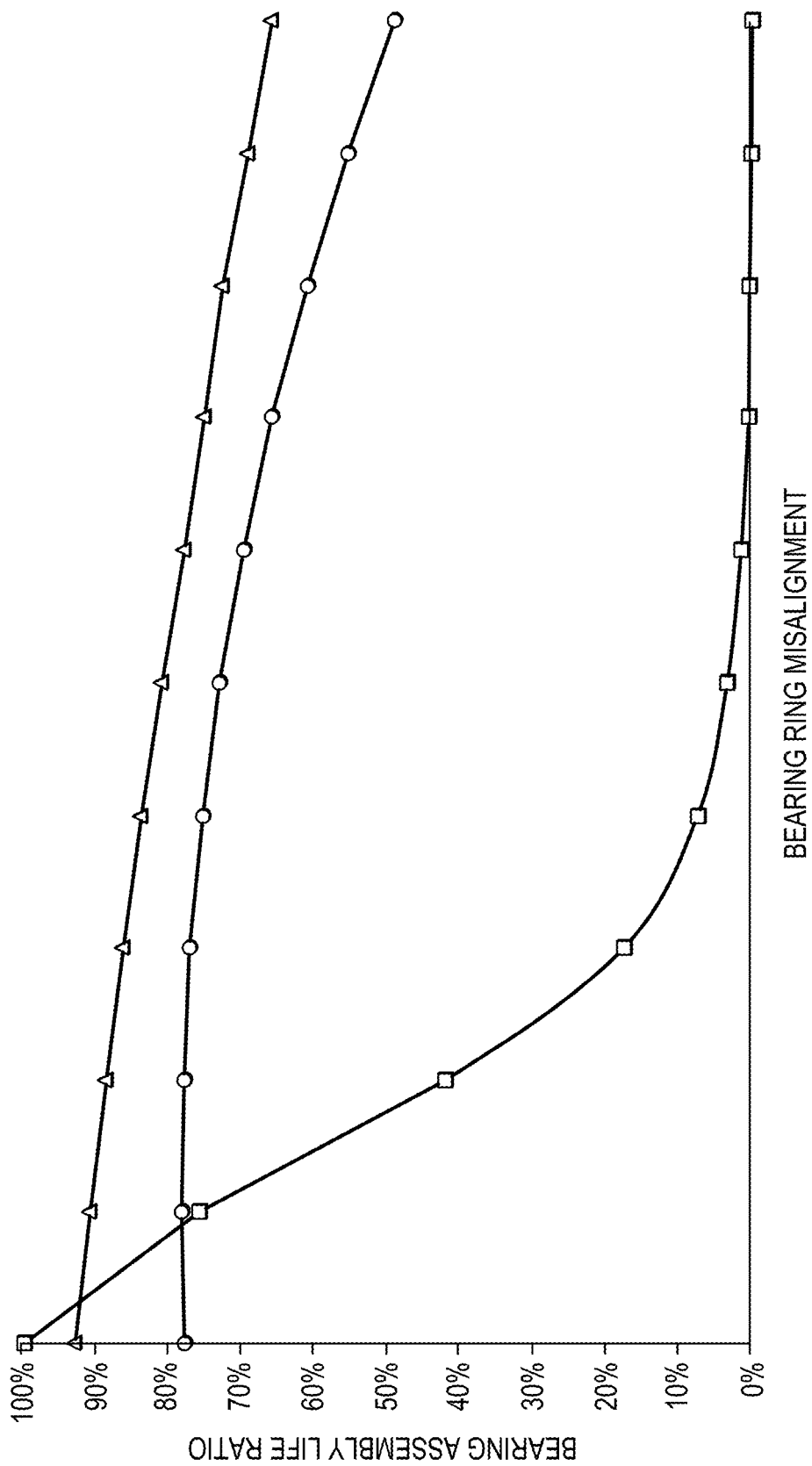
FIG. 5 shows a diagram illustrating the bearing assembly life ratio vs. the bearing ring misalignment.

In real applications, there is always misalignment so bearings in arrangements with radial gaps have longer lives compared to bearings in the arrangements without gaps. The arrangement where one bearing takes axial load only and the other radial load only, is slightly advantageous (line with triangular points) over an arrangement where one bearing takes both axial and radial load and the other only controls clearance (line with circular points). As can be seen in the diagram of FIG. 5, both alternatives have longer system life, at even slightly misaligned conditions, compared to having no bearing with a radial gap.

The above-described bearing assembly provides a reduced sensitivity to misalignment of a shaft with bearing pairs taking axial load in both directions while also maximizing the system life of the pairs by providing a radial gap between one outer ring of the bearing pair and the housing, while providing an easy and cost efficient arrangement.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

REFERENCE NUMBER LIST

1 bearing assembly
2 shaft
3 first bearing pair
3 second bearing pair
4, 4' housing
6, 6' first rolling bearing
8, 8' second rolling bearing
10, 10' inner ring
12, 12' outer ring
14, 14' rolling elements
16, 16' inner ring
18, 18' outer ring
20, 20' rolling elements
22, 22' distance element
24, 24' restricting element
26, 26' restricting element
28, 28' lubricant passage
30, 30' radial gap
32 motor
34, 34' axial clearance

We claim:

1. A bearing assembly for supporting a shaft in a housing, the bearing assembly comprising:
   at least a first bearing pair including a first angular contact rolling bearing and a second angular contact rolling bearing arranged back to back, each one of the first and second rolling bearings including an inner ring attached to the shaft, an outer ring and a plurality of rolling elements disposed between the inner ring and the outer ring;
   wherein a radial gap is provided between the outer ring of the first rolling bearing and the housing and the outer ring of the second rolling bearing is in contact with the housing;
   wherein the bearing assembly further comprises at least a second bearing pair spaced from the first bearing pair and including a first angular contact rolling bearing and a second angular contact rolling bearing arranged back to back, each one of the first and second rolling bearings of the second bearing pair including an inner ring attached to the shaft, an outer ring and a plurality of rolling elements disposed between the inner ring and the outer ring, a radial gap being provided between the outer ring of the first rolling bearing of the second bearing pair and the housing and the outer ring of the second rolling bearing of the second bearing pair is in contact with the housing; and
   wherein the first rolling bearing of the first bearing pair and the first rolling bearing of the second bearing pair are each an axially inner bearing and are arranged facing each other.

2. The bearing assembly according to claim 1, wherein each of the first rolling bearings and the second rolling bearings has a contact angle, the contact angle of one of the first rolling bearings has a value different than a value of the contact angle of one of the second rolling bearings.

3. The bearing assembly according to claim 1, wherein each of the first rolling bearings and the second rolling bearings has a contact angle, the contact angle of one of the first rolling bearings has a value equal to a value of the contact angle of one of the second rolling bearings.

4. The bearing assembly according to claim 1, further comprising at least one restricting element configured to restrict axial movement of the outer ring of the first rolling bearing of the first bearing pair with respect to the housing.

5. The bearing assembly according to claim 1, wherein the bearing assembly further comprises:
a restricting element configured to restrict axial movement of the outer ring of the first rolling bearing of the second bearing pair, the outer ring of the second rolling bearing of the second bearing pair being in contact with the housing.

6. The bearing assembly according to claim 1, wherein the first rolling bearing or the second rolling bearing of the first bearing pair is configured to either abut against a first axial abutment arranged at an axial outer end of the bearing assembly or a clearance is provided between the axial abutment and the first rolling bearing or the second rolling bearing of the first bearing pair.

7. The bearing assembly according to claim 1, wherein the first rolling bearing or the second rolling bearing of the second bearing pair is configured to either abut against a second axial abutment arranged at an axial outer end of the bearing assembly or a clearance is provided between the second axial abutment and the first rolling bearing or the second rolling bearing of the second bearing pair.

8. The bearing assembly according to claim 1, wherein the first bearing pair is axially fixed and each outer ring of the second bearing pair is axially displaceable.

9. A centrifugal compressor including a bearing assembly according to claim 1.

10. A bearing assembly for supporting a shaft in a housing, the bearing assembly comprising:
a first bearing pair including a first rolling bearing and a second rolling bearing arranged back to back, each one of the first and second rolling bearings including an inner ring attached to the shaft, an outer ring and a plurality of rolling elements disposed between the inner ring and the outer ring, a radial gap being provided between the outer ring of the first rolling bearing and the housing and the outer ring of the second rolling bearing being in contact with the housing; and
a second bearing pair spaced from the first bearing pair and including a first rolling bearing and a second rolling bearing arranged back to back, each one of the first and second rolling bearings of the second bearing pair including an inner ring attached to the shaft, an outer ring and a plurality of rolling elements disposed between the inner ring and the outer ring, a radial gap being provided between the outer ring of the first rolling bearing of the second bearing pair and the housing and the outer ring of the second rolling bearing of the second bearing pair being in contact with the housing; and
wherein the first and second bearings of the first bearing pair are each axially fixed and the outer ring of each one of the first and second bearings of the second bearing pair is axially displaceable.

11. A bearing assembly for supporting a shaft in a housing, the bearing assembly comprising:
a first bearing pair including a first rolling bearing and a second rolling bearing arranged back to back, each one of the first and second rolling bearings including an inner ring attached to the shaft, an outer ring and a plurality of rolling elements disposed between the inner ring and the outer ring, a radial gap being provided between the outer ring of the first rolling bearing and the housing and the outer ring of the second rolling bearing being in contact with the housing; and
a second bearing pair spaced from the first bearing pair and including a first rolling bearing and a second rolling bearing arranged back to back, each one of the first and second rolling bearings of the second bearing pair including an inner ring attached to the shaft, an outer ring and a plurality of rolling elements disposed between the inner ring and the outer ring, a radial gap being provided between the outer ring of the first rolling bearing of the second bearing pair and the housing and the outer ring of the second rolling bearing of the second bearing pair being in contact with the housing;
wherein two restricting elements are each arranged at one axial end of each outer ring of the first bearing pair for restricting the axial movement of the outer rings of the first bearing pair and clamping the outer rings together; and
wherein each outer ring of the second bearing pair has at least one axial end that is not axially retained.

* * * * *